US006013800A

United States Patent [19]
Lee et al.

[11] Patent Number: 6,013,800
[45] Date of Patent: *Jan. 11, 2000

[54] SOLID CATALYST FOR PREPARING NITRILES AND ITS PREPARATION

[75] Inventors: Young K. Lee; Chae-Ho Shin; Tae-Sun Chang; Deug-Hee Cho; Dong-Ku Lee, all of Taejon, Rep. of Korea

[73] Assignee: Korea Research Institute of Chemical Technology, Rep. of Korea

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/734,532

[22] Filed: Oct. 21, 1996

Related U.S. Application Data

[60] Division of application No. 08/427,957, Apr. 26, 1995, which is a continuation-in-part of application No. 08/358,173, Dec. 16, 1994, abandoned.

[30] Foreign Application Priority Data

Apr. 27, 1994 [KR] Rep. of Korea ............... 94 8961

[51] Int. Cl.$^7$ ............... C07D 241/24; C07D 213/84; C07D 213/85
[52] U.S. Cl. ............... 544/336; 546/286; 558/328
[58] Field of Search ............... 558/328; 544/336; 546/286

[56] References Cited

U.S. PATENT DOCUMENTS

| | | | |
|---|---|---|---|
| 3,297,587 | 1/1967 | Scherhag ............... | 252/432 |
| 3,463,604 | 8/1969 | Tave ............... | 23/23 |
| 3,838,068 | 9/1974 | Hagedorn et al. ............... | 252/437 |
| 3,840,472 | 10/1974 | Colgan et al. ............... | 252/435 |
| 3,998,876 | 12/1976 | Kato et al. ............... | 260/530 |
| 4,036,870 | 7/1977 | Castellion ............... | 260/465.3 |
| 4,469,810 | 9/1984 | Kato et al. ............... | 502/209 |

OTHER PUBLICATIONS

R.G. Rizayev et al., "Some fundamental and practical aspects of the ammoxidation of alkylbenzenes," Applied Catalysis A: General, vol. 83, No. 2 (Apr. 21, 1992), pp. 103–141.

S.H. Kim et al., "Ammoxidation of toluene over Cu Na–ZSM–5," Applied Catalysis A: General, vol. 85 (1992), pp. 47–61.

A. Martin et al., "Ammoxidation of Picolines on Vanadium Phosphate Catalysts," Applied Catalysis, vol. 49, No. 2 (Apr. 17, 1989), pp. 205–211.

L. Forni, "Ammoxidation of 2–Methylpyrazine Over Oxide Catalysts," Applied Catalysis, vol. 20 (1986), pp. 219–231.

A. Andersson et al., "Activities of V–Ti–O Catalysts in the Ammoxidation of 3–Picoline," Journal of Catalysis, vol. 65, No. 1 (Sep. 1980), pp. 9–15.

A. Hoek et al., "Enantioselectivity of Nickel Catalysts Modified with Tartaric Acid or Nicek Tartrate Complexes," Journal of Catalysis, vol. 58, No. 2 (Jun. 30, 1979), pp. 276–286.

B.V. Suvorov, "Catalytic vapor–phase oxidation and oxidative ammonolysis of organic compounds as methods for synthesizing monomers," International Chemical Engineering, vol. 8, No. 4 Oct. 1968, pp. 588–614.

*Primary Examiner*—Michael G. Ambrose
*Assistant Examiner*—Ebenezer Sackey
*Attorney, Agent, or Firm*—Finnegan, Henderson, Farabow, Garrett & Dunner, L.L.P.

[57] ABSTRACT

This invention relates to a solid catalyst having the following formula for preparing nitrites and its preparation, in particular which contains molybdenum and phosphorus, etc. as main component which can improve the conversion and the selectivity in case of using as a catalyst during the process for preparing a heteroaromatic nitriles.

$$Mo_xP_yO_zX \cdot Y$$

wherein,

Mo is molybdenum;

P is phosphorus;

O is oxygen;

X is ammonium salt or ion;

Y is water; and x, y and z are respectively a number of atom, wherein y/x is 0.01~5 and z is 0.01~10.

8 Claims, No Drawings

SOLID CATALYST FOR PREPARING NITRILES AND ITS PREPARATION

REFERENCE TO CROSS-RELATED APPLICATION

This application is a divisional application of U.S. patent application Ser. No. 08/427,957, filed Apr. 26,1995, entitled "SOLID CATALYST FOR PREPARING NITRILES AND ITS PREPARATION," which is a continuation-in-part of U.S. patent application Ser. No. 08/358,173, filed Dec. 16, 1994, entitled "SOLID CATALYST FOR PREPARING NITRILES AND ITS PREPARATION now abandoned."

FIELD OF THE INVENTION

This invention relates to a solid catalyst having the following formula for preparing nitrites and its preparation, in particular which contains molybdenum and phosphorus, etc. as main components which can improve the conversion and the selectivity when used as a catalyst during the process for preparing a heteroaromatic nitrile.

$$Mo_x.P_y.O_z.X.Y$$

wherein,

Mo is molybdenum;

P is phosphorus;

O is oxygen;

X is ammonium salt or ion; Y is water; and x,y and z are respectively a number of atoms, wherein y/x is 0.01~5 and z is 0.01~10.

General methods for preparing a heteroaromatic nitrile such as cyanopyrazine or cyanopyridine are given by ammoxidation of an alkyl-substituted heteroaromatic compound, and then vanadium oxide [Applied Catalysis, Vol.83, p103 (1992)], vanadium oxide/alumina or their mixture with other various metal oxides is used as a catalyst.

It has known that transition metal oxides such as antimony oxide, molybdenum oxide, iron oxide and tin oxide, etc. have activity for ammoxidation of an alkyl-substituted heteroaromatic compound.

Besides, multi-element oxides such as antimony/vanadium/manganese oxide supported on alumina are often used as catalyst.

These cases are known whereby the conversion against reactant is 90% and the selectivity against cyanopyrazine is 75% [Applied Catalysis, Vol. 20, p219 (1986)].

On the other hand, reactivities of an alkyl-substituted heteroaromatic compound under catalysts were analyzed in "Applied Catalysis, Vol. 85, p47" as follow; when Cu-Na/zeolite catalyst is used, the conversion of 3-methylpyridine is 82%, and then the selectivity for pyridine is 4% and 3-cyanopyridine is 96%. In 1986, Shimiz and Shinkichi et al. disclosed that when $VP_xSb_yO_z$ catalyst is used, the conversion of 3-methylpyridine is 98.7% and the selectivity of 3-cyanopyridine is 80% [European Patent No. 253,360]. But, the above literature does not disclose the selectivities for pyridine, tar, carbon monoxide, carbon dioxide, etc.

In 1979, A. Anderson disclosed that when $V_6O_{13}$ catalyst is used, the conversion of 3-methylpyridine is 100%, the selectivity of 3, cyanopyridine is 80%, the selectivities of carbon monoxide and carbon dioxide are 15% and the selectivity of tar is 5% [Journal of Catalysis, Vol. 58, p283].

In 1989, Anderson disclosed that when a vanadium-titanium-oxygen catalyst is used, the conversion of 3-methylpyridine is 100%, the selectivity of 3-cyanopyridine is 80%, the selectivities of carbon monoxide and carbon dioxide are 5% and the selectivity of tar is 15% [Journal of Catalysis, Vol. 65, p9].

Finally, in 1989, A. Martin et al. disclosed that when a vanadium-phosphorus-oxygen catalyst is used, the conversion of 3-methylpyridine is 98%, the selectivity of 3-cyanopyridine is 93% and the selectivities of carbon monoxide and carbon dioxide are 15% [Applied Catalysis, Vol. 49, p205].

The conversion of 3-methylpyridine and the selectivities of 3-cyanopyridine by using the above known catalysts may be compared as follows; when the conversion of 3-methylpyridine is 80~100%, the selectivity of 3-cyanopyridine is about 80%. This shows high selectivities only of pyridine, carbon monoxide, carbon dioxide and tar. As the result it was found that a side reaction occurred under the above catalysts and a simultaneous byproduct of a great quantity is produced. In the above, the cases of 2-methylpyrazine and 3-methylpyridine were illustrated but the cases of 2-methylpyridine and 4-methylpyridine were also analyzed to give similar results.

Ammoxidation of an alkyl-substituted heteroaromatic compound is carried out by the following process; cyanopyrazine or cyanopyridine as the desired compound is obtained through acid and amide as the intermediates [Int. Chem. Eng. 8,888 (1968)], and then the selectivity of cyanoprazine or cyanopyridine is closely related to those of acid and amide. Commonly, the more the selectivities of cyanopyrazine and cyanopyridine, as the major reaction product of methylpyrazine or methylpyridine, are increased, the more those of acid and amide are decreased. The other way, the more the selectivities of cyanopyrazine and cyanopyridine are decreased, the more those of acid and amide are increased. However, the cases of reaction under the known catalyst were not analyzed about the selectivity of first intermediate, for example, acid and amide such as nicotinic acid and nicotine amide produced during ammoxidation of 3-methylpyridine in the vapor phase.

Therefore, in order to solve the problems in the use of the known catalyst as mentioned above, the studies for thermal stability at high temperature as well as development of new catalyst are actively going on. At present, vanadium-phosphorus-oxygen catalysts have been mainly used.

The present inventors investigated a new catalyst with controllable production of by-products by increasing the conversion and the selectivity during the process for preparing a heteroaromatic nitrile. As the result, it is found that a catalyst comprising molybdenum and phosphorus with proper ratio as main component has high activity and selectivity, in particular that the thermal stability or hygroscopic property at atmosphere and reaction activity are greatly changed in accordance with the content of phosphorus.

SUMMARY OF THE INVENTION

The object of this invention is to provide a solid catalyst for preparing nitrites which can effectively control the production of by-products by increasing the conversion and the selectivity during the process for preparing a heteroaromatic nitrile by ammoxidation of an alkyl-substituted heteroaromatic compound in the vapor phase.

This invention relates to a solid catalyst of the following formula for preparing nitriles $$Mo_x.P_y.O_z.X.Y$$

wherein,

Mo, P, O, X, Y, x, y and z are respectively defined as the above-mentioned.

DETAILED DESCRIPTION OF THE INVENTION

This invention relates to a novel solid catalyst which can improve the conversion and the selectivity during the process for preparing heteroaromatic cyanides by ammoxidation of alkyl-substituted heteroaromatic compounds, and its preparation. According to this invention, the solid catalyst can be prepared by following process.

Firstly, a salt containing molybdenum, for example ammonium molybdate tetrahydrate (($NH_4$)$_6$ $Mo_7O_{24} \cdot 4H_2O$), is added into water, and completely dissolved at the maximum temperature of 100° C. by slowly increasing the reaction temperature. And, phosphoric acid is added in the solution in order that y/x, a atomic ratio of phosphorus to molybdenum, is 0.01~5. Then, if y/x is less than 0.01, the desired reaction activity cannot be obtained, and if y/x is more than 5, the hygroscopic property of catalyst itself is too high because of addition of excessive phosphoric acid and the reactivity is decreased. Therefore, in this invention, in order to accelerate the reaction rate and easily remove residue, the temperature of the above reaction solution should be raised by 50~10° C., and then water is removed during the reaction under stirring to concentrate the reactant, thereby the desired product is obtained as the bulk solid.

According to this invention, the bulk solid may be dried for 1~15 hours in an oven at 30~150° C. and pulverized to be effectively used as a catalyst. The pulverized powder is kept in an airtight dessicator to prevent from contacting with water in atmosphere. The more y/x of the pulverized powder is decreased, the more the color is white, and the more y/x is increased, the more color is light green and the hygroscopic property is increased.

The solid catalyst of this invention prepared by the above method was confirmed by BET surface area measurement, pore volume measurement, infrared spectrometer, thermal gravimetric spectrometer, X-ray diffraction spectroscope, X-ray fluorescence spectroscope, elemental analyzer, wet analysis of molybdenum, phosphorus, etc. According to the result of thermal gravimetric analysis for the catalyst, the catalyst weight was decreased at 350° C. under nitrogen by removing free ammonium salt or ion(X), free water(Y) and other impurities.

The solid catalyst prepared by the above method may be pretreated and activated at above 350° C., preferably at 400~600° C. under nitrogen, in order to effectively use it as a reaction catalyst. According to the result of X-ray diffraction analysis, it is found that a phase having thermal stability exists as amorphous form.

To activate the catalyst, a quartz reactor with a sintered quartz is filled with catalyst, and then nitrogen gas is flowed in at 4l/hr of flow and pretreatment is carried out at 400~600° C. for 2~6 hours. As the result, the conversion and the selectivity of the activated catalyst were improved in comparison with those of the known catalyst. The solid catalyst of this invention has a high activity during the process for preparing a heteroaromatic nitriles.

This invention may be illustrated in more detail as following examples, but it is not limited by the examples.

EXAMPLE 1

Ammonium molybdate tetrahydrate [($NH_4$)$_6$ $Mo_7O_{24} \cdot 4H_2O$] of 18.54 g was dissolved in 100 ml of water, and the solution was slowly heated under stirring. After adding 3.63 g of 85% phosphoric acid (y/x=0.3), the solution was stirred at 80° C. and concentrated to remove water.

The obtained bulk solid was completly dried in oven and pulverized, and then the final product was kept in dessicator to prevent from contacting with water.

EXAMPLE 2

Catalyst was prepared by using the method discribed in the above Example 1 except that 200 ml of water and 9.08 g of 85% phosphoric acid (y/x=0.75) were used.

EXAMPLE 3

Catalyst was prepared by using the method described in the above Example 1 except that 12.11 g of 85% phosphoric acid (y/x=1.0) was used.

EXAMPLE 4

Catalyst was prepared by using the method described in the above Example 1 except that 18.16 g of 85% phosphoric acid (y/x=1.5) was used.

COMPARATIVE EXAMPLE 1

Catalyst was prepared by using the method described in the above Example 1 except that 72.66 g of 85% phosphoric acid (y/x=6.0) was used.

COMPARATIVE EXAMPLE 2

Catalyst was prepared by using the method described in the above Example 1 except that 0.06 g of 85% phosphoric acid was used.

EXPERIMENTAL EXAMPLE

In order to activate catalysts prepared by Examples 1~4 and Comparative Examples 1~2, a quartz reactor (16 mm diameter, 200 mm length) with a sintered quartz was filled with 500 mg of prepared catalyst and then pretreated at 500° C. Nitrogen gas was flowed into the reactor at 4 l/hr of the flow rate for 4 hours After adding an alkyl-substituted heteroaromatic compound such as 2-methyl pyrazine, 2-methylpyridine, 3-methylpyridine 2-methylpyridine, 3-methylpyridine or 4-methylpyridine at 0.06 of space time, 10 moles of ammonia and 13.5 moles of oxygen were added per 1 mole of an alkyl-substituted heteroaromatic compound, and then ammoxidation was carried out for 24 hours at 400° C., The result was given in Table 1.

TABLE 1

| | | | Selectivity (%)** | | |
| --- | --- | --- | --- | --- | --- |
| Catalyst | Reactant | Conversion (%)* | Nitrile | Amide and Acid | Carbon dioxide and by-product |
| Example 1 | 2-methylpyrazine | 90.5 | 91.6 | 6.3 | 2.1 |
| | 2-methylpyridine | 91.4 | 92.2 | 6.3 | 1.5 |
| | 3-methylpyridine | 65.8 | 89.3 | 8.8 | 1.9 |
| | 4-methylpyridine | 87.2 | 90.4 | 8.6 | 1.0 |
| Example 2 | 2-methylpyrazine | 100 | 98.9 | 0.9 | 0.2 |
| | 2-methylpyridine | 100 | 98.9 | 1.0 | 0.1 |
| | 3-methylpyridine | 99.2 | 98.5 | 1.4 | 0.1 |

TABLE 1-continued

| Catalyst | Reactant | Conversion (%)* | Selectivity (%)** | | |
|---|---|---|---|---|---|
| | | | Nitrile | Amide and Acid | Carbon dioxide and by-product |
| | 4-methylpyridine | 100 | 98.8 | 1.1 | 0.1 |
| Example 3 | 2-methylpyrazine | 98.9 | 92.2 | 7.3 | 0.5 |
| | 2-methylpyridine | 99.3 | 92.6 | 6.8 | 0.6 |
| | 3-methylpyridine | 66.9 | 89.0 | 10.2 | 0.8 |
| | 4-methylpyridine | 97.1 | 91.5 | 8.1 | 0.4 |
| Example 4 | 2-methylpyrazine | 85.2 | 91.4 | 7.5 | 1.1 |
| | 2-methylpyridine | 78.5 | 87.5 | 10.3 | 2.2 |
| | 3-methylpyridine | 63.2 | 82.4 | 15.2 | 2.4 |
| | 4-methylpyridine | 77.4 | 85.7 | 12.2 | 2.1 |
| Comp. Example 1 | 2-methylpyrazine | 1.5 | 83.3 | 12.0 | 4.7 |
| | 2-methylpyridine | 2.1 | 87.5 | 8.6 | 3.9 |
| | 3-methylpyridine | 1.3 | 84.1 | 11.3 | 4.6 |
| | 4-methylpyridine | 2.0 | 86.9 | 9.2 | 3.9 |
| Comp. Example 2 | 2-methylpyrazine | 21.4 | 86.3 | 9.9 | 3.8 |
| | 2-methylpyridine | 34.3 | 88.8 | 7.7 | 3.5 |
| | 3-methylpyridine | 30.9 | 86.7 | 10.3 | 3.0 |
| | 4-methylpyridine | 31.5 | 87.7 | 9.1 | 3.2 |

$$^{*}\text{Conversion}(\%) = \frac{\text{Moles of the reacted reactant}}{\text{Moles of the supplied reactant}} \times 100$$

$$^{**}\text{Selectivity}(\%) = \frac{\text{Moles of the produced compound}}{\text{Moles of the supplied reactant}} \times 100$$

As the above results show, the conversion and the selectivity according to each catalyst have shown a large difference. In case of a heteroaromatic nitrile was prepared by catalyst of this invention, the selectivity of by-product such as carbon dioxide and tar, etc. was below 1% as the sum of all, and the conversion was increased up to 100%. The catalyst prepared by this invention has shown a high activity for preparing a heteroaromatic nitrile.

What is claimed is:

1. A process for preparing a heteroaromatic nitrile compound, comprising:
   ammoxidation of an alkyl substituted heteroaromatic compound in the presence of a solid catalyst of the following formula;

$Mo_x.P_y.O_z$ wherein, Mo is molybdenum;
   P is phosphorus;
   O is oxygen;
   x, y and z are respectively a number of atoms, wherein y/x is 0.01~5 and z is 0.01~10;
   wherein said solid catalyst further comprises water and ammonium,
   wherein the solid catalyst is concentrated from a solution comprising a molybdenum salt, comprising water and ammonium and then pretreated in inert gas at about 400° C. to about 600° C. for about 2 to about 6 hours, the water and ammonium remaining in the solid catalyst after said pretreatment.

2. The process for preparing a heteroaromatic nitrile compound as claimed in claim 1, wherein said alkyl-substituted heteroaromatic compound is selected from the group of 2-methylpyrazine, 2-methylpyridine, 3-methylpyridine and 4-methylpyridine.

3. The process for preparing a heteroaromatic nitrile compound as claimed in claim 1, wherein said alkyl-substituted heteroaromatic compound is 2-methylpyrazine.

4. The process for preparing a heteroaromatic nitrile compound as claimed in claim 1, wherein said alkyl-substituted heteroaromatic compound is 2-methylpyridine.

5. The process for preparing a heteroaromatic nitrile compound as claimed in claim 1, wherein said alkyl-substituted heteroaromatic compound is 3-methylpyridine.

6. The process for preparing a heteroaromatic nitrile compound as claimed in claim 1, wherein said alkyl-substituted heteroaromatic compound is 4-methylpyridine.

7. A process for preparing a heteroaromatic nitrile compound, comprising: ammoxidation of an alkyl substituted heteroaromatic compound in the presence of a solid catalyst consisting essentially of molybdenum, phosphorus, oxygen, water and ammonium, wherein a ratio of phosphorus to molybdenum in said solid catalyst ranges from about 0.01:1 to about 5:1, said water and ammonium remaining in said solid catalyst after said solid catalyst is concentrated from a solution comprising a molybdenum salt and treated in an inert gas at 400° C. to 600° C. for 2 to 6 hours.

8. A process for preparing a heteroaromatic nitrile compound, comprising: ammoxidation of an alkyl substituted heteroaromatic compound in the presence of a catalyst, wherein said catalyst is prepared by
   adding phosphorus to a solution comprising molybdenum salt, wherein the ratio of phosphorus to molybdenum in said solution is between about 0.01 to about 5,
   removing water from said solution to obtain a solid product, and pretreating said product in inert gas above about 350° C. to obtain said catalyst.

* * * * *

UNITED STATES PATENT AND TRADEMARK OFFICE
CERTIFICATE OF CORRECTION

PATENT NO.: 6,013,800

DATED: January 11, 2000

INVENTOR(S): Lee et al.

It is certified that an error appears in the above-identified patent and that said Letters Patent is hereby corrected as shown below:

CLAIM 1, Col. 5, L. 45, "$Mo_x . P_y . O_z$" should read -- $Mo_x \cdot P_y \cdot O_z$ --

Signed and Sealed this

First Day of August, 2000

*Attest:*

Q. TODD DICKINSON

*Attesting Officer*     *Director of Patents and Trademarks*